United States Patent
Bost et al.

[11] Patent Number: 6,031,214
[45] Date of Patent: Feb. 29, 2000

[54] DEVICE FOR HEATING AN AEROFOIL

[75] Inventors: Michel Bost, Joinville le Pont; Jean-Cyril Bauchet, Montgeron, both of France

[73] Assignee: Eurocopter, Marignane Cedex, France

[21] Appl. No.: 08/796,588

[22] Filed: Feb. 6, 1997

[30] Foreign Application Priority Data

Feb. 8, 1996 [FR] France .................................. 96 01560

[51] Int. Cl.$^7$ .............................. H05B 3/34; H05B 3/06; B64D 15/00
[52] U.S. Cl. ......................... 219/545; 219/202; 219/520; 244/134 D
[58] Field of Search .................................. 219/201, 202, 219/528, 529, 535, 541, 545, 547, 548, 549; 244/134 R, 134 C, 134 D

[56] References Cited

U.S. PATENT DOCUMENTS

| 1,703,005 | 2/1929 | Hewitt ..................................... 219/545 |
| 2,496,279 | 2/1950 | Ely et al. . |
| 2,743,890 | 5/1956 | La Rue ................. 244/134 D |
| 3,178,560 | 4/1965 | Mapp et al. ............................. 219/528 |
| 3,349,359 | 10/1967 | Morey ...................................... 219/545 |
| 3,721,799 | 3/1973 | Carlstrom ................................. 219/545 |
| 4,737,618 | 4/1988 | Barbier et al. . |
| 4,764,665 | 8/1988 | Orban et al. ............................. 219/549 |
| 4,841,124 | 6/1989 | Cox et al. . |
| 4,888,472 | 12/1989 | Stitz ......................................... 219/548 |
| 4,983,814 | 1/1991 | Ohgushi et al. ......................... 219/545 |
| 5,131,812 | 7/1992 | Boyd et al. . |
| 5,289,722 | 3/1994 | Tanaka ..................................... 219/545 |
| 5,412,181 | 5/1995 | Giamati ..................................... 219/548 |

FOREIGN PATENT DOCUMENTS 2 284 521 4/1976 France .
2 660 281 10/1991 France .

Primary Examiner—Sang Paik
Attorney, Agent, or Firm—Henderson & Sturm LLP

[57] ABSTRACT

The heating device comprises electrically conducting longitudinal fibers extending substantially parallel to a leading edge of the aerofoil close to said leading edge, and means for electrically connecting the ends of the longitudinal conducting fibers to an electric power supply. The conducting fibers are grouped together in conducting rovings forming part of a hybrid fabric which furthermore includes a weft of electrically insulating fibers woven together and woven with the conducting rovings.

5 Claims, 2 Drawing Sheets

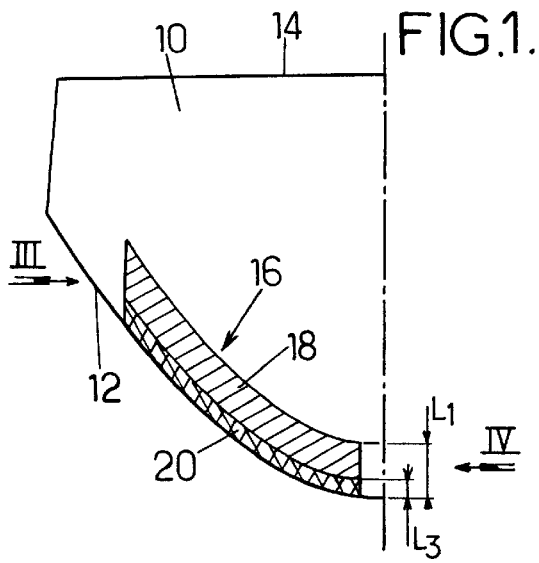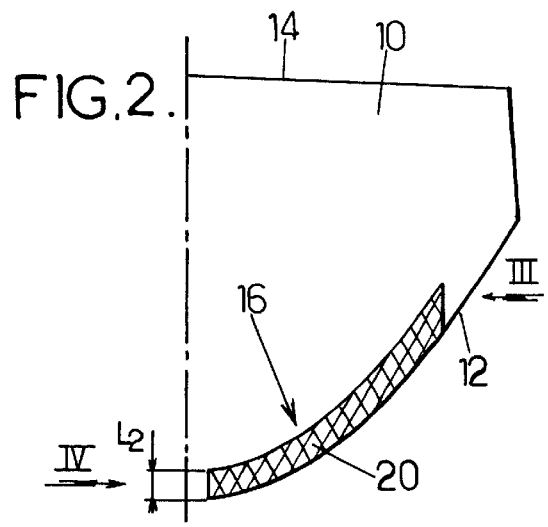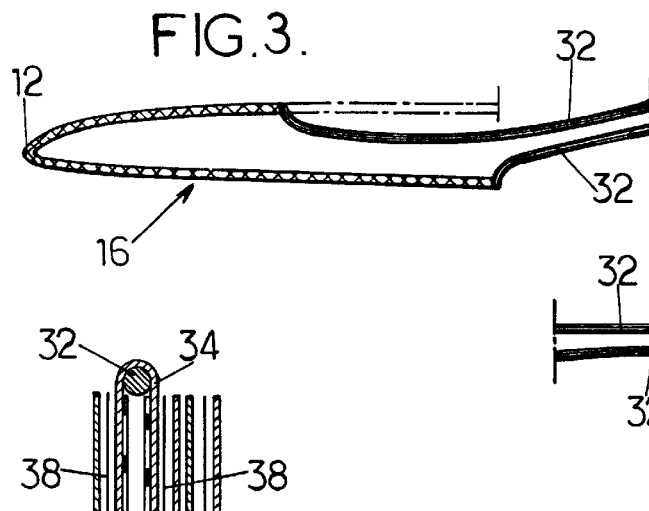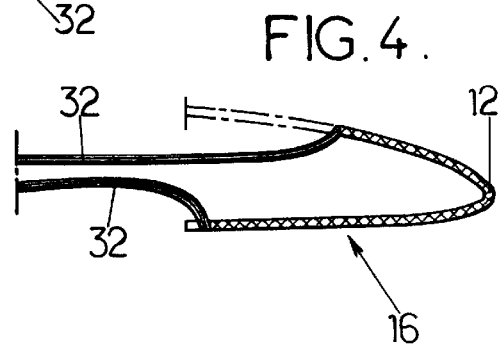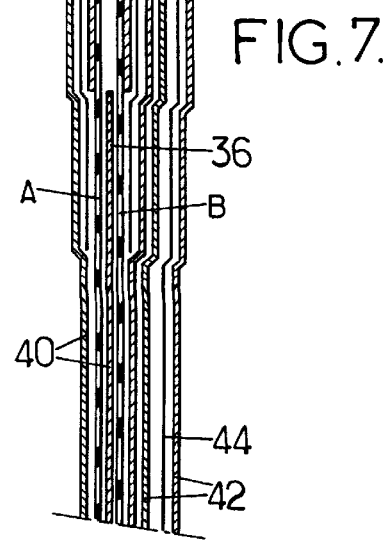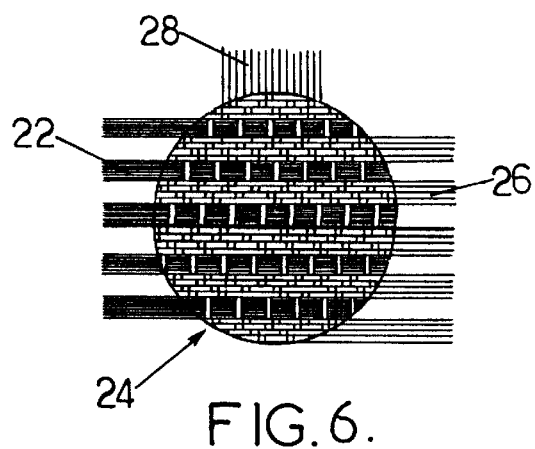

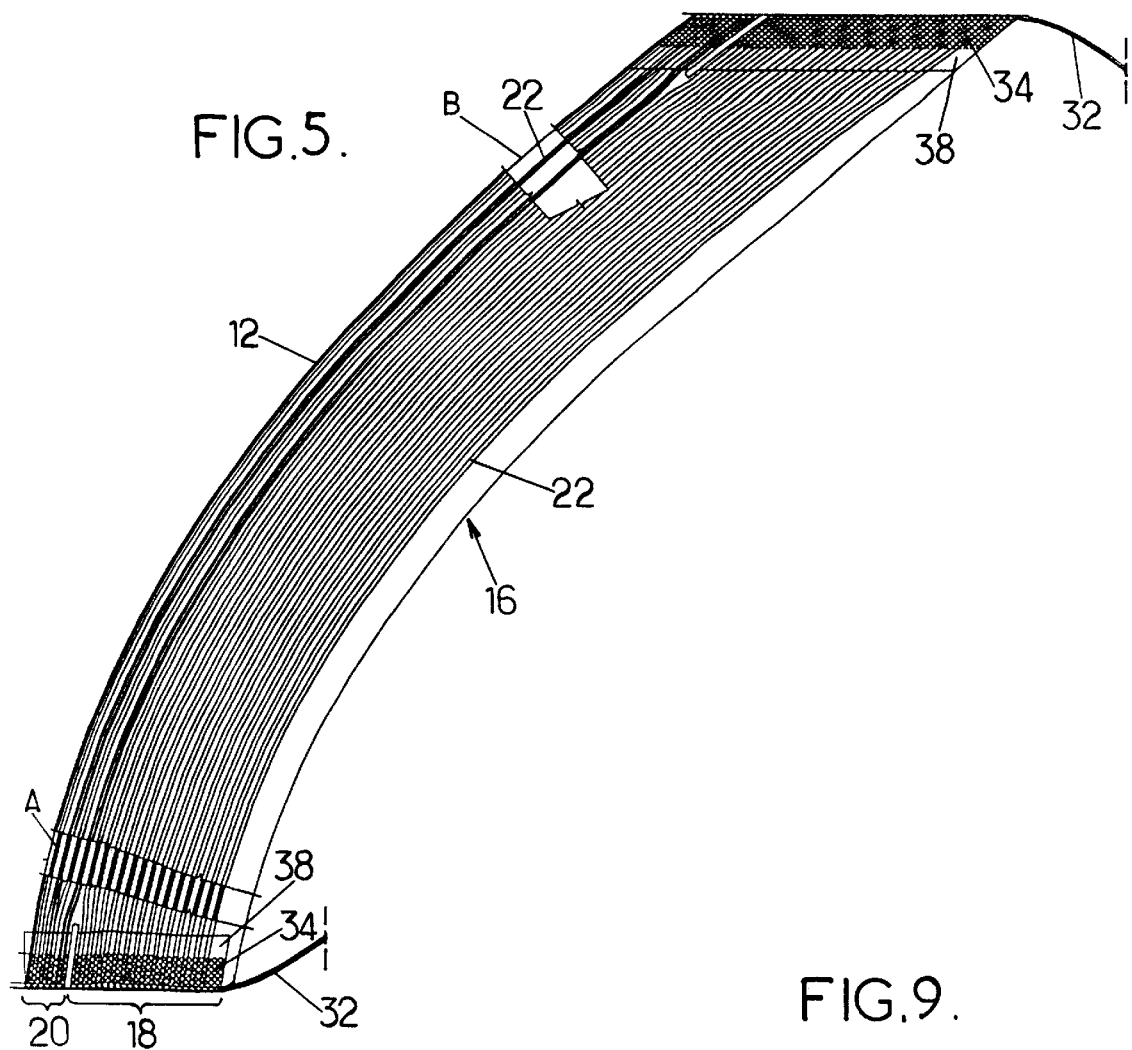
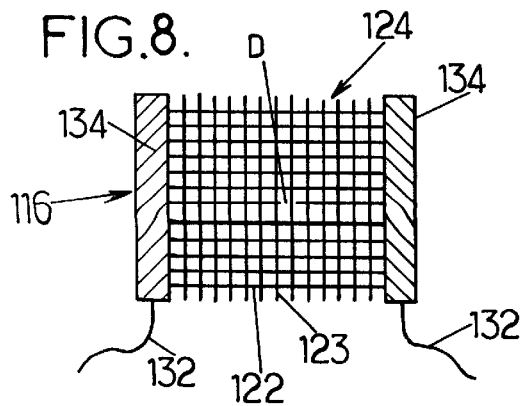
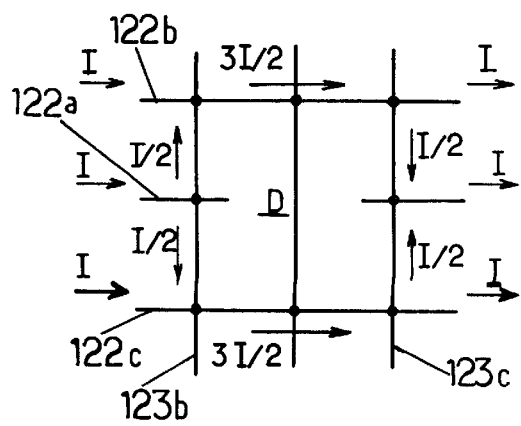

DEVICE FOR HEATING AN AEROFOIL

BACKGROUND OF THE INVENTION

The present invention relates to a device for heating an aerofoil. The aerofoils in question are generally those the aerodynamic shape of which has not to be disturbed by the formation of ice, especially helicopter blades (main rotor or counter-torque rotor) or alternatively aeroplane wings, etc.

The problem of the icing-up of the aerofoils is well known in the aeronautical industry. The shape of the aerofoils may be altered owing to the formation of ice resulting in the fact that during flight the aerofoil encounters droplets of super cooled water contained in the atmosphere.

This problem is often dealt with by equipping the aerofoil with a Joule-effect heating structure. A distinction is made between "de-icers", having heat-dissipating resistive elements powered intermittently in order to eliminate the ice which regularly forms, and "anti-icing devices", whose resistive elements are powered continuously in order to prevent ice from forming. The present invention may be applied to de-icers and to anti-icing devices.

The heating structure usually consists of metallic resistors. These metallic resistors pose problems of mechanical strength, particularly in the case of an aerofoil made of composite material, of resistance to defects (multiple redundancy is needed in order to guard against breakage of a metallic filament preventing the entire device from operating), of nonuniformity of the surface density of the heating, and of corrosion.

In order to limit the impact of these problems, it has been proposed to use a composite de-icer, whose resistive elements are composed of carbon fibers (see U.S. Pat. No. 4,737,618). The composite structure of the de-icer is constructed laid out flat: plies of uni-directional carbon fibers are dispensed and interposed between insulating and support fabrics made of fiberglass. The carbon plies and the glass fabrics are impregnated with a thermosetting resin. The de-icer made laid out flat is then shaped in an appropriate mold where a heating cycle is applied in order to set the resin. This method is suitable for the production of a de-icer the definitive shape of which is not too complicated, for example a de-icer intended to equip the main blade section of a wing or blade whose leading edge is straight or approximately straight, the uni-directional carbon fibers being arranged parallel to the leading edge. However, for an aerofoil of complicated shape, it is difficult to exercise control over the spatial distribution of the uni-directional carbon fibers, which arises when the de-icer is shaped. There is the risk, on the one hand, of obtaining build-up of conducting fibers over some portions of the chord, which results in a problem of local overheating, and on the other hand of obtaining other portions which are lacking in carbon fibers, which results in a problem of local icing-up. In particular, if the region near the leading edge is convexed in two directions at some points, then there is a risk of having gaps in the carbon fibers in the immediate vicinity of the leading edge, whereas this is where the need for heating is the greatest. This problem is encountered especially at the end of the main blade section of a blade or of a wing.

For such aerofoils of complicated shape, one solution might be to provide several layers of uni-directional fibers not parallel to the leading edge but crossed with each other. However, the drawback of such a solution is that it would produce non-uniform heating. In particular, this solution would lead to conducting elements of different apparent lengths being arranged along the surface of the aerofoil, which would cause variations in resistance from one element to another.

One object of the present invention is to propose a heating device based on carbon fibers (or on other conducting fibers that can be integrated into a composite structure) which is easy to handle and which can, especially, be used on aerofoils of complicated shape.

SUMMARY OF THE INVENTION

The invention thus proposes a device for heating an aerofoil, comprising electrically conducting longitudinal fibers extending substantially parallel to a leading edge of the aerofoil in a region of the aerofoil including said leading edge, and means for electrically connecting the ends of the longitudinal conducting fibers to an electric power supply. The conducting fibers are grouped together in conducting rovings forming part of a hybrid fabric embedded in cured resin, this hybrid fabric further including a weft of electrically insulating fibers woven together and woven with the conducting rovings.

The insulating fibers of the hybrid fabric provide the conducting fibers with cohesion during the construction and shaping of the device. They prevent the longitudinal conducting fibers from dispersing, which makes them easier to handle, and allows them to be aligned parallel to the leading edge.

The hybrid fabric can adopt relatively complicated shapes, while at the same time ensuring an even distribution of conducting fibers. The weft formed by the insulating fibers holds the conducting rovings, to a large extent preventing them from spreading out and from contracting, while at the same time allowing a certain amount of relative slippage between the fibers in order to allow the fabric to follow relatively complicated shapes.

The heating device according to the invention can be adapted for different distributions of surface heating-power density according to need. One possibility is to provide several layers of hybrid fabric over some portions of the region near the leading edge. Another possibility is to provide for some portions of the hybrid fabric to have just a fraction of the density of rovings of conducting fibers in the other portions of hybrid fabric. This may be obtained simply by local removal of conducting rovings from a uniform hybrid fabric.

In an advantageous embodiment, the hybrid fabric further includes rovings of transverse conducting fibers woven with the insulating fibers of said weft and with the rovings of longitudinal conducting fibers. This gives excellent resistance to defects. In the event of a longitudinal conducting roving breaking, the transverse rovings near the break locally divert the current which means that the broken roving continues to convey the current except over the small gap where the break has occurred. The transverse conducting rovings thus limit the heating deficit, and confine it to an almost point region instead of a strip parallel to the leading edge which is what happens if use is made of longitudinal rovings alone.

BRIEF DESCRIPTION OF THE DRAWINGS

FIGS. 1 and 2 are views from below and above of an aerofoil equipped with a heating device according to the invention.

FIGS. 3 and 4 are views, respectively in the directions III and IV indicated in FIGS. 1 and 2, of a heating device according to the invention.

FIG. 5 is a view in the plane of the leading edge of a heating device according to the invention.

FIG. 6 is a diagrammatic view from above of a hybrid fabric.

FIG. 7 is a view in section showing the structure of a heating device according to the invention.

FIG. 8 is a diagram of another embodiment of the invention.

FIG. 9 is a diagram illustrating the resistance to defects of a device according to FIG. 8.

DESCRIPTION OF PREFERRED EMBODIMENTS

FIG. 1 shows the pressure face and FIG. 2 the suction face of an aerofoil 10 consisting of the distal end of a helicopter blade. At this end, the leading edge 12 of the blade curves toward the trailing edge 14 with a shape which, for example, is parabolic. At the aerofoil end 10, the surface forming the region near the leading edge 12 thus has two convex curvatures: one following the curvature of the leading edge 12 and the other corresponding to the transition from the pressure face to the suction face (FIGS. 1 to 4).

The aerofoil end 10 is provided with a heating device 16 having the form of composite heating mat which envelopes the region near the leading edge 12 and is itself covered with a sheath, not represented. By way of example the heating mat 16 may, on the pressure face, cover a width L1 (measured at right angles to the span of the blade) corresponding to 11.5% of the chord of the blade, and, on the suction face, cover a width L2 corresponding to 5.9% of the chord. In the example represented in FIGS. 1 and 2, the heating mat 16 includes two regions 18, 20 arranged to dissipate different surface heating-power densities.

The region 20, represented by cross-hatching, for example dissipates at a surface power density of 2 W/cm$^2$ This region 20 extends over the suction face over the width L2, covers the leading edge 12 and extends, over the pressure face, over a width L3 corresponding, for example, to 3% of the chord. The region 18, represented by single hatching in FIG. 1, corresponds to the rest of the heating mat 16 on the pressure face, and dissipates a surface power density of 1.5 W/cm$^2$ for example.

FIG. 5 shows in greater detail that part of the heating mat 16 which extends over the pressure face of the aerofoil end. The heating resistive elements of the mat 16 are rovings of longitudinal carbon fibers 22 extending parallel to the leading edge 12. These rovings 22 form part of a hybrid fabric 24 represented diagrammatically in FIG. 6. In addition to the conducting rovings 22, the hybrid fabric 24 includes rovings of longitudinal insulating fibers 26 and transverse rovings 28 made of fiberglass forming a supporting weft. These fibers 26, 28 are woven together and woven with the rovings 22 of carbon fibers.

In the example represented in FIG. 5, the heating mat 16 includes one layer of such a hybrid fabric in the region 18, and two layers of hybrid fabric in the region 20. Provision may especially be made for one and the same layer A of hybrid fabric to extend right around the surface of the heating mat 16 and for a second layer B to be superposed in the region 20 alone. In the example represented in FIG. 5, the density of conducting rovings in the layer B (for example 1.4 rovings/cm) is half the density of conducting rovings in the layer A (for example 2.8 rovings/cm). This can be obtained by using two different hybrid fabrics for the layers A and B (for example fabrics marketed under the respective references G834 and G845 by the company Brochier), or starting with one and the same hybrid fabric with a density of 2.8 from which one conducting roving out of two has been extracted in order to produce the layer B.

To connect the ends of the longitudinal conducting fibers 22 to an electric power supply (not represented) of the aircraft, a metallic conducting cable 32 and a metallic mesh 34 are provided at each end of the hybrid fabric. The cable 32 is arranged along the end of the hybrid fabric, and it projects from a lateral edge of the hybrid fabric as shown in FIG. 5. The metallic mesh 34 is folded along the end of the hybrid fabric in such a way that it envelopes the conducting cable 32 and covers the two faces of the hybrid fabric close to the end in question. This arrangement can be seen in the sectional view of FIG. 7, which shows in greater detail the arrangement of the layers of which the heating mat 16 is formed.

FIG. 7 thus shows the two layers A, B of hybrid fabric 24 one placed on each side of an insulating layer 36 made of fiberglass fabric. At the end of the device, the metallic mesh 34 folded over the two layers A, B of hybrid fabric traps the metallic cable 32 and ensures good electrical contact. To improve this electrical contact still further, a ply of carbon fibers 38 is placed on each side of the layers A, B and of the mesh 34 close to the end of the mat 16 over a width which is greater than that of the mesh 34. The whole assembly is sandwiched between two insulating fabrics 40 made of fiberglass. Two additional layers 42 of fiberglass fabric and, between these, a layer of adhesive 44 are provided on the outer face of the heating matting.

Fabrics preimpregnated with a thermosetting resin are used as materials for the layers A, B, 36, 40, 42 when manufacturing the heating mat 16, this resin being polymerized after the heating mat has been shaped.

FIG. 8 is a diagrammatic view laid out flat of heating mat 116 constituting another embodiment of the invention. The references 132 and 134 denote the means of electrical connection provided at each end of the hybrid fabric, namely the metallic cable 132 and the metallic mesh 134. The hybrid fabric used 124 differs from the one described earlier in that it further includes rovings of transverse carbon fibers 123 woven with the weft (not represented) of insulating fibers and with the rovings of longitudinal carbon fibers 122. An example of such a fabric with two-directional carbon fibers is the fabric marketed by the company Brochier under reference G837.

In the embodiment of FIG. 8, only the longitudinal conducting fibers 122 are supplied with current. In the event of a defect D occurring, by the breaking of a roving 122 of longitudinal carbon fibers, the transverse conducting fibers 123 will allow the current to flow around the defect D as shown in FIG. 9. The nominal current I can continue to flow along the broken roving 122a, except at the break D. Around the defect D the current flow is nevertheless higher (local current 3I/2 in the adjacent longitudinal rovings 122b, 122c and local current I/2 in the adjacent transverse rovings 123b, 123c). This mechanism limits the consequences of any breaks in the powered longitudinal rovings.

What is claimed is:

1. A device for heating an aerofoil, comprising electrically conducting longitudinal fibers extending substantially parallel to a leading edge of the aerofoil in a region of the aerofoil including said leading edge, and means for electrically connecting the ends of the longitudinal conducting fibers to an electric power supply, wherein the conducting fibers are grouped together in conducting rovings forming part of a hybrid fabric embedded in a set resin, said hybrid fabric further including a weft of electrically insulating fibers woven together and woven with the conducting rovings, and wherein the electrical connection means comprise, at each end of the hybrid fabric, a metallic conducting cable arranged along said end of the hybrid fabric and projecting from at least one lateral edge of the hybrid fabric, and a metallic mesh folded along said end of the hybrid fabric in such a way as to envelope said conducting cable and the hybrid fabric near said end.

2. The device for heating an aerofoil as claimed in claim 1, having several layers of hybrid fabric over at least part of said region of the aerofoil.

3. The device for heating an aerofoil as claimed in claim 1, wherein the hybrid fabric includes a portion where the density of rovings of longitudinal conducting fibers is a fraction of the density of rovings of longitudinal conducting fibers in other portions of the hybrid fabric.

4. The device for heating an aerofoil as claimed in claim 3, wherein said portion of the hybrid fabric where the density of rovings of longitudinal conducting fibers is a fraction of the density of rovings of longitudinal conducting fibers in other portions of the hybrid fabric is obtained by locally removing conducting rovings from a uniform hybrid fabric.

5. The device for heating an aerofoil as claimed in claim 1, wherein the hybrid fabric further includes rovings of transverse conducting fibers woven with the insulating fibers of said weft and with the rovings of longitudinal conducting fibers, and wherein the electrical connection means couple the ends of only the longitudinal conducting fibers to the electric power supply.

* * * * *